Aug. 26, 1969   E. T. DE PASS ET AL   3,463,845
INJECTION MOLDING APPARATUS FOR MAKING COMPOSITE
PAPER-PLASTIC LIDS AND METHOD
Filed April 6, 1967                                    2 Sheets-Sheet 1
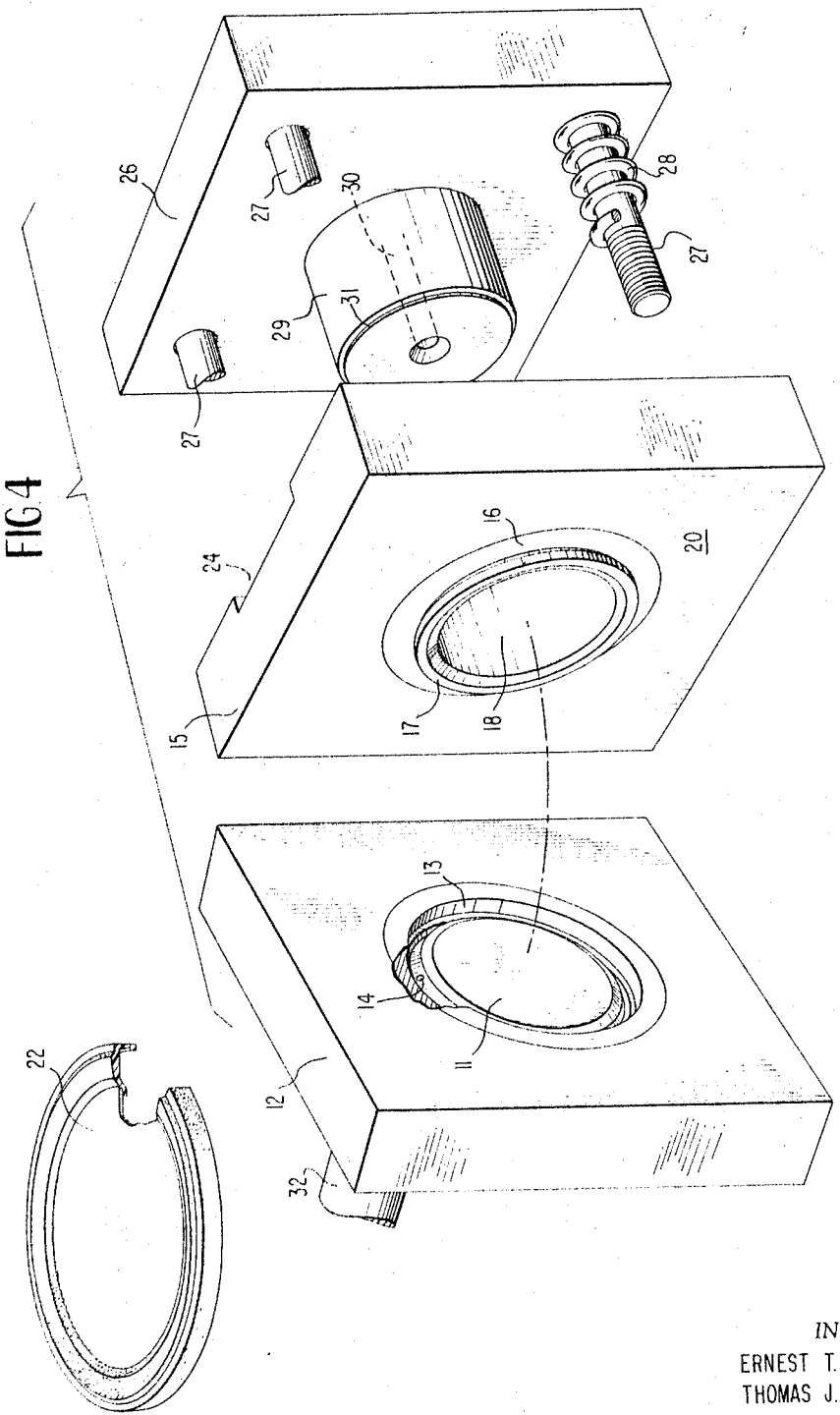
INVENTORS
ERNEST T. DePASS
THOMAS J. P. COOK
BY Charles P. Bauer
ATTORNEY INVENTORS
ERNEST T. DePASS
THOMAS J. P. COOK BY *Charles P. Bauer*

ATTORNEY

# United States Patent Office 3,463,845
Patented Aug. 26, 1969

3,463,845
INJECTION MOLDING APPARATUS FOR MAKING COMPOSITE PAPER-PLASTIC LIDS AND METHOD
Ernest T. De Pass, Bound Brook, and Thomas J. P. Cook, Kendall Park, N.J., assignors to Union Camp Corporation, New York, N.Y., a corporation of Virginia
Filed Apr. 6, 1967, Ser. No. 628,976
Int. Cl. B29f 1/00; B29d 3/00
U.S. Cl. 264—90         2 Claims

ABSTRACT OF THE DISCLOSURE

An injection molding apparatus for molding container lids formed of paper center blanks and outer plastic rims includes orienting means to feed and position the blank within the injection opening perpendicular to the axis thereof and moving means to bring the blank into registry with a lip on the male die of the molding apparatus.

---

This invention relates to a method and apparatus for making composite covers and more particularly to a method and apparatus for making composite paper and plastic container lids.

Many food products, such as ground coffee, margarine, and salted nuts, are sold in sealed cans, but are provided with a resilient lid for protective reclosure after the can has been opened. Also, many types of comestible liquids, such as soup and coffee, are sold in open top containers. These containers are quite often carried by the purchaser from the purchase area to another area where the product will be consumed. In order to permit the safe, sanitary transportation of the filled container, a cover or lid must be provided to seal the container and prevent the spilling of its contents.

Two different types of lids are commonly used to seal open top containers. One type is a disc which is forced into an internal groove in the container. The other type is a resilient lid which fits over the top of the container. In order to securely retain the resilient lid in cooperating engagement with the top of the container to prevent spilling during transportation, the lid must be capable of deflecting and exerting a restraining force on the container.

Resilient lids capable of effectively sealing a container are usually molded from a homogeneous flexible plastic material such as polyethylene. These lids, however, have certain inherent disadvantages. A major disadvantage is the difficulty in printing an advertisement or message on the lids. Since the lid is normally injection molded, naturally it is impossible to print on it prior to molding. After molding, the shape and structural features of the lid make good printing expensive and highly impractical. The problem is greatly compounded by the inherent difficulty of printing on plastic and particularly on the types of plastic commonly used for manufacturing resilient lids.

In order to solve this problem, the applicant has invented a new and unique method of making composite container lids and an apparatus for accomplishing the method. According to the present method, a printed blank of paper or other sheet material is fed into a molding apparatus comprising a feed means, an orientation means, a male and female die and an injection molding means. The blank is positioned in the apparatus and a plastic rim is molded around the circumference of the blank to provide a planar paper central portion and an offset plastic rim for engagement with the top of the container to be sealed.

An object of this invention is to provide a method of making composite container lids.

Another object is to provide a method of making a container lid having a planar central portion and an offset rim.

Another object is to provide orientation means for positioning a paper blank within an injection molding apparatus.

Another object is to provide a method of making a container lid having a central planar portion of paper and an offset rim of plastic.

Another object is to provide a method of making a composite container lid that is low in cost and sufficiently economical to permit discarding after use.

Another object is to provide a method of orienting a blank between a male and female die accurately and automatically.

Another object is to provide an apparatus for efficiently making composite paper and plastic container lids.

Another object is to provide an automatic molding die apparatus having a minimum of moving parts that is economical to construct, maintain and operate.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawing, in which:

FIGURE 1 is a perspective view of the composite lid;

FIGURE 4 is an exploded view of the composite lid-making apparatus.

Figure 2:
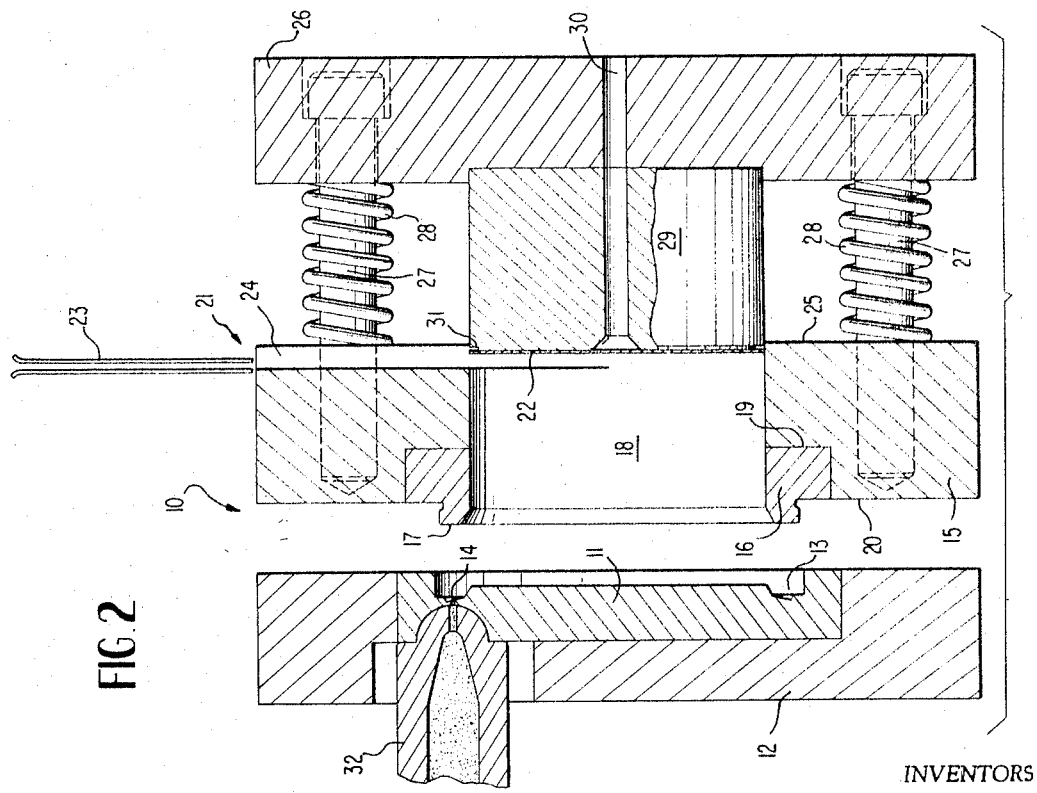
FIGURE 2 is a cross sectional view of the composite lid-making apparatus in its open position.

Referring now to the drawing wherein like reference numerals designate like or corresponding parts throughout the several views, there is shown in FIGURE 2 a molding apparatus 10 in its open position. The molding apparatus 10 comprises a female die 11 secured to a stationary plate 12. The female die 11 has a recessed cavity 13 which is generally the shape of the offset rim to be formed. An orifice 14 is located in the cavity 13 and extends through the stationary plate 12. The orifice 14 communicates with an opening in the stationary plate 12 which enables an injection molding means 32 to be placed in communication with the orifice 14 for forcing plastic material into the die cavity 13. The injection molding means 32 can be of any conventional design, known to those skilled in the art, for forcing plastic material under pressure into a mold cavity.

Figure 3:
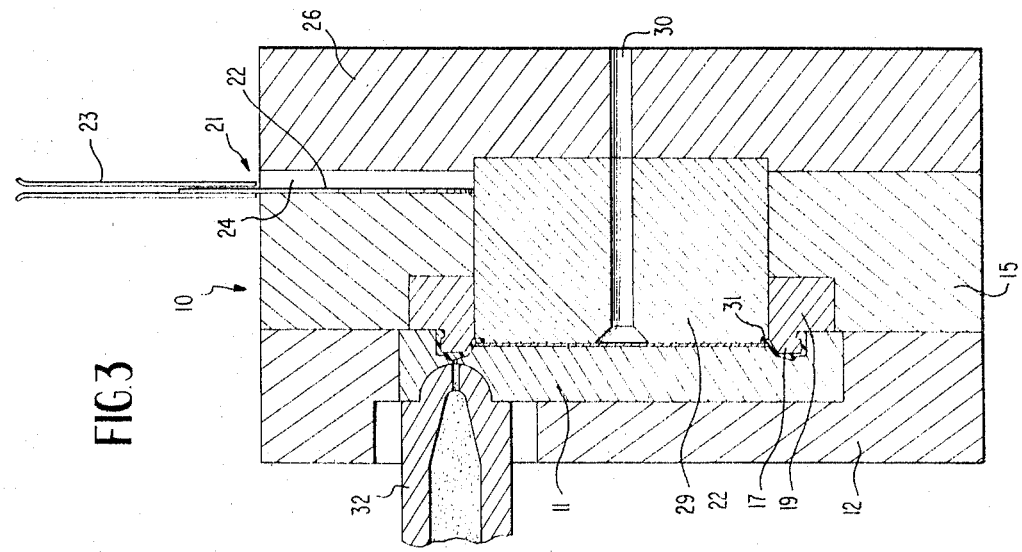
FIGURE 3 is a cross sectional view of the composite lid-making apparatus in its closed position.

Mounted on a support means 15 in complementary relationship to the female die 11 is a male die 16. Extending outwardly from a face of the male die 16, which is parallel and adjacent the female die 11, is a forming lip 17. The forming lip 17 is of a size and orientation to fit within the cavity 13 of the female die 11 when the molding apparatus 10 is in its closed position, as shown in FIGURE 3. When the molding apparatus 10 is in its closed position, the forming lip 17, in conjunction with the cavity 13, provides a mold cavity which defines the shape of the offset rim to be formed.

The support means 15 has an opening 18 substantially conforming to the internal diameter of the male die 16 extending through its central portion and an indented portion 19 extending laterally from the opening 18 along a face 20 adjacent the stationary plate 12. The male die 16 is secured within the indentation 19 to provide an extended continuous opening 18 through the support means 15 and the male die 16.

An orientation means 21, adapted to enable a blank 22 to be positioned within the opening 18 when the molding apparatus 10 is in its open position, is mounted adjacent the upper edge of the support means 15. The orientation means 21 comprises a guide 23 mounted coaxially to a channel 24 disposed in the support means 15. The channel 24 is of a width substantially equal to the diameter of the opening 18 and extends along a face 25 in the support means 15. The channel 24 is a segmented cut-out extending from the outer periphery of the support means to the center of the opening 18. The guide 23 consists of a pair of parallel plates separated by a distance substantially equal to the thickness of a blank 22 and adapted to remain in coaxial alignment to the channel 24 and extend outwardly, parallel to the support means 15 and perpendicular to the longitudinal axis of the opening 18.

Mounted in parallel spaced relationship to the face 25 of the support means 15 is a punch plate 26. The punch plate 26 is slidably mounted on a plurality of lugs 27. The lugs 27 are secured to the face 25 of the support means 15 and extend outwardly perpendicularly thereto. A coil spring 28 is disposed about the lugs 27 between the support means 15 and the punch plate 26. The springs 28 provide a means for biasing the punch plate 26 away from the support means 15 while enabling the punch plate 26 to be moved into juxtaposition with the face 25 of the support means 15.

A plunger 29 is mounted to and extends outwardly from the punch plate 26 in coaxial complementary alignment with the opening 18. The plunger 29 is of a diameter sufficient to enable it to slide within the opening 18 when the punch plate 26 is moved toward the support means 15. When the punch plate 26 is biased away from the support means 15 by the action of the springs 28, the plunger 29 extends within the opening 18 to a position slightly behind the guide 23. In this position, the plunger 29 will not block the channel 24 and will permit the blank 22 to enter the opening 18 through the guide 23 and the channel 24. Extending centrally through the plunger 29 and the punch plate 26 in coaxial alignment is a vacuum hole 30. The vacuum hole 30 is connected to a suitable source of vacuum (not shown) to provide a suction force on the face of the plunger 29. Extending inwardly along the face of the plunger 29, from its outer periphery towards the vacuum hole 30 for a slight distance, is an annular indentation 31, as shown in FIGURE 4.

In operation, a plurality of blanks 22 are fed from a hopper (not shown) into the guide 23. Upon entering into the guide 23, the blanks 22 are oriented so that they are in alignment with the channel 24 and parallel to the face 25 of the support means 15. In this position, the blanks 22 descend by gravity through the guide 23 and the channel 24 until they come to rest within the opening 18. In their lowermost or rest position, the blanks 22 are in abutting engagement with the internal diameter of the support means 15 as formed by the opening 18 and in juxtaposition to the indented face of the plunger 29. When the blank 22 lies entirely within the opening 18 in juxtaposition with the face of the plunger 29, a vacuum is created through the vacuum hole 30. The vacuum causes the blank 22 to be drawn into contact with the face of the plunger 29 and the suction securely retains it in position. When the blank 22 is securely positioned along the face of the plunger 29, an actuating means (not shown), such as a hydraulic or electromagnetic cylinder, is energized causing the punch plate 26 to be moved along the lugs 27 towards the support means 15. As the punch plate 26 moves toward the support means 15, the plunger 29 with the blank 22 secured thereto moves further into the opening 18.

In order to prevent more than one blank at a time from entering the opening 18, the guide 23 and the channel 24 are oriented and constructed so that successive blanks will abut the preceding blank. The plunger 29 is disposed behind the guide 23 a distance sufficient to permit only one blank at a time to enter the opening 18 when the molding apparatus 10 is in its open position. The indentation 31 on the face of the plunger 29 is of a width slightly less than the thickness of the blank 22 so that as the plunger 29 moves into the opening 18 successive blanks will not be caught in the indentation 31 but will rest upon the outer periphery of the plunger 29, as shown in FIGURE 3.

As the punch plate 26 moves toward the support means 15, the springs 28 compress until their resistance causes the support means 15 to move with the punch plate 26 towards the stationary plate 12. The punch plate 26 and the support means 15 will move towards the stationary plate 12 until the plunger 29, carrying the blank 22, abuts the central portion of the female die 11 and the forming lip 17 on the male die 16 enters the cavity 13 to form a mold cavity.

After the female and male dies 11 and 16 have been brought together and the blank 22 is in position, a plastic molding material is injected under pressure by conventional injection molding techniques through the injection molding means 32 and orifice 14 into the cavity 13, completely filling the space between the forming lip 17 and the cavity 13. Additionally, the plastic molding material flows into and fills the indentation 31 in the face of the plunger 29. Except for the space between the forming lip 17 and the cavity 13 and the indentation 31 in the plunger face, the mold cavity is otherwise sealed by the blank 22. The plastic material is injected into the die cavities under substantial pressure, generally in excess of about 1,000 pounds per square inch. As a result, the plastic material is forced into every available space to completely fill the die cavities and form a molded rim about the blank 22. As the pressure under which the plastic is molded causes very intimate contact between it and the blank and since the plastic material is selected to have substantial adhesive compatibility with the blank, a strong bond between the plastic material and the blank is obtained. In the molding process, the plastic material is caused to fill up the space between the blank 22 and the indentation 31 on the face of the plunger 29 and to adhere to the surface of the blank 22 adjacent the indentation 31 or to interlock with the blank 22 as by entering such interstices as may be present in the blank near the edges thereof.

While the blank 22 in the preferred embodiment of this invention has been described as being constructed from paper or board, it will be obvious to those skilled in the art that any type of sheet material can be used, including those of a non-porous nature. When the blank 22 is constructed from a non-porous, non-adherable material, the blank can be provided with a series of grooves, slots and orifices adjacent its outer edge in order to allow the plastic molding material to enter the irregularities and be bonded thereto.

By providing the indentation 31 in the face of the plunger 29, the plastic material enters into and fills the space between the plunger 29 and the blank 22 and extends from the outer edges of the blank 22 inwardly along a portion of the face of the blank for a sufficient distance to securely bond the plastic rim to the blank.

Since the plastic rim is injection molded, it can, without difficulty, be made in any shape as demanded by the contour of the container, and to any degree of flexibility or rigidity merely by appropriately varying the dimensions of the rim and the plastic material used in making it. Furthermore, although the lid shown is round, it will be understood that such lid can be made oval, square, rectangular or in any other configuration.

After the plastic has set, either by cooling if it is a thermoplastic material or by appropriate curing if it is a heat-set or a catalyzed resin material, the actuators are de-energized and the punch plate 26 is returned to its open position. As the punch plate 26 is returned to its open position, the compressive force of the springs 28 is relieved and the support means 15 is allowed to return to its open position. Because of the suction caused by the vacuum through the vacuum hole 30, the blank 22 with the plastic rim secured thereto is removed from the female die 11. Once separated from the female die 11, the complete composite lid can be removed from the forming lip 17 of the male die by any manner well known to those skilled in the art.

As the plunger 29, punch plate 26 and support means 15 return to their original open position, another blank will drop by gravity into the now vacant opening 18 and the entire process is repeated.

Although the specification and drawings describe and illustrate only a single cavity and cooperating equipment, it will be understood that multiple cavities can be used so that more than one lid can be made at a time.

Having described our invention, what we claim as new and desire to secure by Letters Patent is:

1. A method of making a composite product comprising the steps of:
    feeding a planar blank into an opening coaxial to a male and female die;
    positioning said blank in a plane perpendicular to the longitudinal axis of said opening behind said male and female dies, and in front of a plunger which moves along said longitudinal axis; retaining said blank on said plunger by applying a vacuum through said plunger;
    advancing said blank through said opening into complementary engagement with said female die so that the periphery of said blank extends into a portion of the mold cavity;
    advancing said male die into complementary engagement with said female die in order to form the mold cavity about the periphery of said blank;
    injecting a plastic material into said mold cavity to form a plastic rim about the periphery of said blank; and,
    separating the male die, plunger, and composite product held thereto by vacuum from the female die to facilitate removal of the product.

2. A method in accordance with claim 1, wherein the plunger has an indentation in the face thereof adjacent to the outer periphery of said blank, whereby the plastic material flows into said indentation during the injecting step to secure the plastic rim to said blank.

References Cited
UNITED STATES PATENTS 2,959,812    11/1960    Allen.
3,151,193    9/1964    Thornton.
3,272,681    9/1966    Langecker _____ 264—94 X

FOREIGN PATENTS 439,009    9/1938    Great Britain.

ROBERT F. WHITE, Primary Examiner

A. M. SOKAL, Assistant Examiner

U.S. Cl. X.R.

18—30, 36; 264—278, 334